Patented Aug. 29, 1950

2,520,318

UNITED STATES PATENT OFFICE 2,520,318

METHOD OF MAKING MUSHROOM SPAWN

Louis Lescarboura, Oxford, Pa., assignor to Lescarboura Spawn Company, Kelton, Pa., a corporation of Delaware No Drawing. Application March 14, 1944,
Serial No. 526,478

4 Claims. (Cl. 47—1.1)

This invention relates to mushroom spawn and the method of making the same, and particularly refers to a mushroom spawn made of grain.

The use of grain for the manufacture of mushroom spawn has, in the past, been carried out in accordance with the procedure set forth in the patent of James W. Sinden, No. 1,869,517, dated August 2, 1932. In accordance with this procedure, dry grain is placed in a bottle with a certain amount of water and calcium carbonate. The bottle containing the grain, water, and calcium carbonate is then closed with a cotton plug and sterilized while standing in an upright position for 35 to 45 minutes at a temperature of 250° F. After cooling, the bottles are inoculated, reclosed, and permitted to stand for the necessary period for the proper growth of mycelium.

The procedure just outlined produces a spawn with some limitations. First, it is quite impractical to use as the grain any cereals except hominy, cracked wheat, whole grain wheat, barley, or rye. Oats and rice are entirely unsuitable, since even using the very minimum of sterilization time, these grains will set to a solid mass completely irremovable from the bottle except by breakage.

Even in the case of grains to which the method is applicable, the sterilization period must not substantially exceed about 45 minutes. If this period is exceeded, a considerable portion of the grains will form a solid mass, the portion amounting, even with a sterilization period of 45 minutes, to one-third to one-half the total grain content of the bottle. Accordingly, it has been found necessary, even in these instances, to pound the bottles upon some resilient object such as a rubber tire to free the spawn sufficiently to enable it to be removed from the bottle. Even then, relatively large chunks are obtained rather than individual grains. If the sterilization is carried out longer than 45 minutes, more and more solidification of the mass in the bottle takes place, with the result that an hour of sterilization will result in substantial agglomeration of the entire contents which are removable in such case with additional difficulty.

Furthermore, difficulty is experienced in any event in connection with the calcium carbonate (chalk) normally added for the purpose of reducing acidity which may develop in the spawn. During the sterilization process and thereafter, there is considerable free liquid in the mixture in the bottle, and it is found that the greater part of the added calcium carbonate will find its way to the bottom of the bottle, with the result that the material is not uniform in its calcium carbonate content and the upper portions of the mixture may become objectionably acidic.

The sterilization period which is consistent with the production of any satisfactory product by this procedure is too short to insure complete destruction of bacteria and, consequently, a quite large percentage of the bottles thus produced is found to be contaminated and, consequently, unusable.

In accordance with the present method, the foregoing procedure is modified in order to produce highly satisfactory results and to utilize in particular such grains as oats to which the former procedure was totally inapplicable.

In accordance with the present invention, the grains are preliminarily boiled in water until fully swelled or cooked. The period through which this cooking is carried out is not critical so long as it is sufficiently long to insure thorough cooking and swelling of the grains. During or following the cooking procedure, dirt, chaff, etc., will float to the top of the water and can be skimmed therefrom very readily. This is very desirable inasmuch as it has been found that fine dirt and chaff is very difficult to sterilize completely. Alternatively, the grain may be soaked in warm water for a period of about 48 hours until swelling takes place, during which soaking period dirt and chaff which floats to the surface may be removed. The grain, from which the soaking water has been drained off, may then be steamed until fully swelled, following which the procedure is the same as that involved when the grain is boiled in water.

The cooked grain from which water is drained is then mixed with the required amount of calcium carbonate (which amount may roughly be a teaspoonful for each eight ounces of grain, eight ounces forming a normal bottle content) and run into the bottles, this being easily accomplished through the use of a funnel since the grain is substantially dry and will very readily pour. The bottles are then plugged with cotton. Inasmuch as the bottles do not contain freely flowing liquid, they may be placed on their sides for sterilization, permitting a larger number of bottles to be stacked in the sterilizer when so placed. Sterilization is then carried out at 250° F. under pressure for at least an hour and preferably up to about an hour and a half. Such a period of sterilization is ample to kill all bacteria. Even if the sterilization is carried out much longer, for example for a period of two hours or more, the cooked grains will not stick together and can readily be shaken up by merely shaking the bottles by hand. Furthermore, inasmuch as there is no free liquid, the calcium carbonate will remain evenly distributed throughout the grain with no danger of its being washed to the bottom of the bottle.

Inoculation may then be effected in conventional fashion and the bottles put aside for growth. Periodically they are desirably shaken, the grains remaining at all times quite free of each other even in the case of such grains as those of oats and rice.

After the growth of mycelium is completed and the spawn is ready for planting, the granules remain entirely separate and slight shaking with the hands will break the threads of mycelium and enable the grains to be individually poured out from the bottle without any remaining therein and without requiring violent treatment for their removal.

The cooking procedure itself is very effective to produce a preliminary sterilization, and the grains drained of water may be run into the bottles while hot with the only possibility of contamination being that through the air to which they are subjected for a very short time during the filling of the bottles. Thus the sterilization time for the filled bottles may be kept down with a very small probability that contamination will show up later. The result is that a very small portion of the bottles will be found to be contaminated.

Excellent growth of mycelium on the cooked grains occurs, and this is true even in the case of oats which, as noted above, have been found quite impossible of use in accordance with the old process.

What I claim is:

1. The method of making mushroom spawn substrate from cereal grains comprising completely cooking and swelling the grains in the presence of water, causing the cooked and swollen grains to be substantially free of adhering water, enclosing said grains against ingress of contaminating organisms, and then sterilizing the grains while so enclosed.

2. The method of making mushroom spawn substrate from cereal grains comprising completely cooking and swelling the grains in the presence of water, substantially removing adhering water from the grains, enclosing the cooked and swollen grains substantially free of adhering water against ingress of contaminating organisms, and then sterilizing the grains while so enclosed.

3. The method of growing mushroom spawn comprising completely cooking and swelling cereal grains in the presence of water, causing the cooked and swollen grains to be substantially free of adhering water, enclosing said grains against ingress of contaminating organisms, then sterilizing the grains while so enclosed, inoculating the grains by the introduction of a mushroom culture, and incubating until the grains are overgrown with mycelium.

4. The method of growing mushroom spawn comprising completely cooking and swelling cereal grains in the presence of water, substantially removing adhering water from the grains, enclosing the cooked and swollen grains substantially free of adhering water against ingress of contaminating organisms, then sterilizing the grains while so enclosed, inoculating the grains by the introduction of a mushroom culture, and incubating until the grains are overgrown with mycelium.

LOUIS LESCARBOURA.

REFERENCES CITED

The following references are of record in the file of this patent:

UNITED STATES PATENTS

| Number | Name | Date |
| --- | --- | --- |
| 1,034,169 | Valentine | July 30, 1912 |
| 1,939,600 | Rettew | Dec. 12, 1933 |
| 2,005,365 | DiGiacinto | June 18, 1935 |
| 2,044,861 | Sinden | June 23, 1936 |
| 2,338,259 | Rettew | Jan. 4, 1944 |

OTHER REFERENCES

Lord, "Everybody's Cook Book," published 1924, page 198.